United States Patent [19]

Yamada et al.

[11] 4,076,734
[45] Feb. 28, 1978

[54] PROCESS FOR PREPARING DINITROANTHRAQUINONES

[75] Inventors: Eiji Yamada; Mutuo Yamada, both of Ibaraki; Kazuyuki Nobuoka, Takarazuka, all of Japan

[73] Assignee: Sumitomo Chemical Company, Limited, Osaka, Japan

[21] Appl. No.: 296,496

[22] Filed: Oct. 4, 1972

[30] Foreign Application Priority Data

Oct. 7, 1971 Japan .................................. 46-79165
Oct. 29, 1971 Japan .................................. 46-86644

[51] Int. Cl.$^2$ ............................................. C07C 79/37
[52] U.S. Cl. ................................................. 260/369
[58] Field of Search ......................................... 260/369

[56] References Cited

FOREIGN PATENT DOCUMENTS 167,699  11/1904  Germany ............................. 260/369

OTHER PUBLICATIONS

Dhar, as cited in Chem. Abst. 14, pp. 3404–3405, (1920).
Lubs, The Chemistry of Synthetic Dyes & Pigments, p. 12, (1955).
Bottger et al., Ann. 160, pp. 145–148, (1871).

*Primary Examiner*—Jane S. Myers
*Attorney, Agent, or Firm*—Sughrue, Rothwell, Mion, Zinn and Macpeak

[57] ABSTRACT

A process for preparing 1,5- and 1,8-dinitroanthraquinones having high purity by reacting anthraquinone and nitric acid and sulfuric acid, sulfuric acid being used in an amount of less than that of said nitric acid, and a method of separating the resulting 1,5-and 1,8-dinitroanthraquinone mixture into each component by using nitrobenzene and/or nitrotoluene.

5 Claims, No Drawings

PROCESS FOR PREPARING DINITROANTHRAQUINONES

BACKGROUND OF THE INVENTION

1. Field of the Invention

This invention relates to a process for preparing 1,5- and 1,8-dinitroanthraquinones with high purity, and to a process for the separation thereof into each component.

2. Description of the Prior Art 1,5- and 1,8-dinitroanthraquinones are important intermediates for producing dispersed dyes of anthraquinone series or threne dyes. That is, 1,5- and 1,8-dinitroanthraquinones can be converted into 1,5- and 1,8-diaminoanthraquinones by reduction, or can be converted to 1,5-dinitro-4,8-dihydroxyanthraquinone and 1,8-dinitro-4,5-dihydroxyanthraquinone, respectively, by phenoxylation, nitration and hydrolysis. Furthermore, these can be converted into the corresponding diaminodihydroxyanthraquinones by reduction. Also, 1,5- and 1,8-dihydroxyanthraquinones can be obtained by methoxylation and subsequent hydrolysis of 1,5- and 1,8-dinitroanthraquinones.

These various intermediates are extremely important as the intermediate compounds for the production of dispersed dyes and threne dyes. These intermediates have so far been synthesized solely via 1,5- and 1,8-anthraquinonedisulfonic acids. As is well known, a mercury catalyst is required in order to introduce sulfonic groups into $\alpha$-positions of anthraquinone by sulfonation and, as the result, the recovery of the slight amount of mercury contained in the waste liquor or the intermediate increases the cost of the conventional process for preparing the intermediates via anthraquinonedisulfonic acids. However, it is difficult to completely remove mercury even with the utmost efforts.

Therefore, since the process via dinitroanthraquinone does not require the addition of mercury, the mercury-removing equipment is not necessary in such process and thus the cost for preventing environmental pollution can be greatly alleviated or completely reduced. However, in the conventionally known method of dinitration of anthraquinone, $\beta$-isomers are produced as by-products in a large proportion which reduces the purity of the product to such an extent that the product does not possess the quality fit for the practical use as it is, and that further purification is required. Thus, the yield is seriously reduced, and the conventional process has not been commercially conducted in view of the complicated and inefficient operation in the purification step. Therefore, the conventional process has not yet been practically realized in industry.

That is, the dinitration reaction of anthraquinone has heretofore been studied by many investigators, and the results of the studies have been disclosed in patents or experimental reports. For example, a process comprising adding dropwise the mixed acid (a mixture of nitric acid and sulfuric acid) onto anthraquinone in 100% sulfuric acid and heating at 80° C for 5 hours and at 125° C for 2 hours, a process comprising heating at 95° C for 2 hours in 96% sulfuric acid using mixed acid, and a process comprising heating at 100° C for 10 hours in 20% fuming sulfuric acid, are described in Helv. Chem. Acta. 14,1404 (1931), U.S. Pat. No. 2,607,782 (1952) and PB report 82,232, p. 929, respectively. In any of these processes, however, a large amount of $\alpha,\beta$-dinitroanthraquinones and $\beta,\beta$-dinitroanthraquinones, i.e., 1,6-, 1,7-, 2,6-, or 2,7-dinitroanthraquinones which are not so valuable as the dyestuff intermediates are produced as by-products in addition to $\beta,\beta$-dinitroanthraquinones, i.e., 1,5- and 1,8-dinitroanthraquinones, resulting in poor yield. For example, it is disclosed in U.S. Pat. No. 2,607,782, that 1,5- and 1,8-dinitroanthraquinones are obtained by adding dropwise the mixed acid to a solution of anthraquinone in 96% sulfuric acid at temperatures ranging from 30° to 70° C, conducting the reaction at 95° C for 2 hours, cooling the reaction mixture to 30° C, separating the precipitates formed by filtration, washing them with 78% sulfuric acid then with water, and drying then the purity of 1,5- and 1,8-dinitroanthraquinones is as low as 65.8% and the yield is 87.3%. In addition, though the product is obtained in 97% yield by pouring the above-mentioned reaction solution into ice-water to precipitate, the purity is extremely low as 57.6% in total content. The other publicly known processes provide similar results.

Also, as the method for separating the resulting 1,5- and 1,8-dinitroanthraquinones from each other, there is a description in Helv. Chem. Acta. 14, 1404 - 27 (1931), in which it is reported that, after dinitration in 100% sulfuric acid, 1,5-dinitroanthraquinone is obtained by filtration and 1,8-dinitroanthraquinone is obtained by diluting the filtrate up to 70% with water. However, it is confirmed that, first of all, the separation of isomers is so incomplete that 20 – 30% of 1,8-dinitroanthraquinone is contained in 1,5-dinitroanthraquinone while $\beta$-isomers as well as 1,5-dinitroanthraquinone are contained in 1,8-dinitroanthraquinone, and thus the purity of 1,8-derivative is as low as less than 50%. In addition, the filtration rate of the reaction mixture is too slow to be practically conducted, and hence this method possesses no practicality with consideration of the filtration property alone.

SUMMARY OF THE INVENTION

As a result of extensive studies on the reaction conditions and catalysts for accelerating the nitration at $\alpha$-positions, the inventors have found that highly pure $\alpha,\alpha$-dinitroanthraquinones can be obtained with markedly accelerating $\alpha$-nitration while depressing $\beta$-nitration, by conducting nitration at low temperatures in the system wherein nitric acid is used as the solvent in the co-presence of sulfuric acid in an amount less than that of nitric acid.

The inventors further found, as the result of the extensive investigations on the method of separating the resulting 1,5- and 1,8-dinitroanthraquinones from each other, the mixture ratio thereof being about 1:1, that the separation can be achieved with ease and certainty by using nitrobenzene or nitrotoluene, or the mixture thereof.

DESCRIPTION OF THE INVENTION

In conducting the nitration, if nitric acid alone is used, the reaction must be carried out at an elevated temperature for a prolonged period of time due to the extremely slow reaction rate, resulting in the increase in the amount of by-product $\beta$-isomers and the decrease in purity.

The total content of $\alpha,\alpha$-dinitroanthraquinones obtained according to the invention reaches as high as 80–90%, and the product can be used directly without further purification as an intermediate for a lot of dyes. Thus, the process of producing various intermediates via dinitroanthraquinone has now been provided with practicality.

In any of the publicly known processes, e.g., nitration with the mixed acid, sulfuric acid is used in a larger amount than that of nitric acid.

Therefore, the effect of the invention that the end product can be obtained with high purity by using the amount of sulfuric acid smaller than that of nitric acid, is truly suprising.

Nitric acid to be used in the invention is desirably socalled concentrated nitric acid which contains 96% of nitric acid, or fuming nitric acid, most preferably the nitric acid usually used in the industrial field as 98% nitric acid whose concentration is 98–100%. The lower the concentration of nitric acid, the slower the reaction rate and the lower the purity of the product. Nitric acid is preferably used in an amount 3–30 times (by weight) that of anthraquinone. Although nitric acid may be used in more excessive amount with no harm, there is no necessity thereof. Therefore, nitric acid is preferably used in an amount about 5 times that of anthraquinone from the economical viewpoint.

As the concentrated sulfuric acid to be added in the invention, sulfuric acid of above 80% in concentration or less than 28% fuming sulfuric acid is desirable. Particularly, 98% sulfuric acid or slightly fuming sulfuric acid is preferable. The amount of sulfuric acid added depends upon the amount of nitric acid, but the amount of more than 0.5 mole based on anthraquinone is preferable and, at the same time, the amount is necessary to be less than that of nitric acid. Although the preferable amount of the concentrated sulfuric acid depends upon the amount of nitric acid, the optimum amount thereof is about 1.5 mole per mole of anthraquinone. That is, it corresponds to about 15% by weight based on nitric acid when nitric acid is used in an amount 5 times that of anthraquinone. If the amount of sulfuric acid added is too small, the reaction is not completed, which results in the decrease in purity of the product. Where sulfuric acid is added lastly, the addition of a largely excess amount of sulfuric acid would not cause any harm, but there is no such necessity. In the process of adding anthraquinone lastly, a largely excess amount of sulfuric acid would lead to the reduction in solubility of anthraquinone, resulting in exerting bad influences on anthraquinone.

As to the reaction temperature, low temperatures of, for example, lower than 50° C, preferably from 0°–25° C, particularly optimally around 5° C are employed. The higher the temperature, the easier the formation of $\beta$-derivatives, on the other hand at a temperature lower than 0° C, the reaction differently proceeds.

After most part of the reaction proceeds, the temperature may be raised to above 30° C so as to convert mononitroanthraquinone which is present in an extremely small amount into dinitroanthraquinone.

The charging of nitric acid, sulfuric acid, and anthraquinone can be effected in two alternative procedures, i.e., first mixing nitric acid and sulfuric acid and finally charging anthraquinone into the mixture, or adding anthraquinone to nitric acid and then adding dropwise thereto sulfuric acid. Either of these procedures can provide good results.

The reaction proceeds in more than 90% at the time when the charging of three components is finished and, in some cases, the reaction is completed in approximately 100% at that time.

In the case where the amount of nitric acid or sulfuric acid is extremely small, the completion of the reaction sometimes requires the prolonged reaction time of from about 3 to 5 hours.

After the completion of the reaction, the reaction mixture may be poured into ice-water in a conventional manner whereby to form crystals. The crystals thus precipitated are filtered, washed and dried to obtain highly pure $\alpha,\alpha$-dinitroanthraquinones, which can be utilized as the intermediate for various dyes without further purification. The process of the present invention may be conducted batchwise or continuously.

The proportion of the resulting 1,5-dinitroanthraquinone to 1,8-dinitroanthraquinone is about 1 : 1 or slightly larger than that. As described above, the resulting mixture dinitroanthraquinones are valuable as they are as the intermediates for dyes and pigments. However, as for the anthraquinone compounds, there exist those 1,5- and 1,8-substituted derivatives which show absolutely different reactivity from each other in a specific reaction. Accordingly, the separation of 1,5-derivative and 1,8-derivative from the mixture would greatly increase the value of the mixture dinitroanthraquinones as the intermediates.

The method of separation in accordance with the invention is based on the surprising discovery as to the selectivity that, when the dinitroanthraquinone mixture is dissolved in nitrobenzene and/or nitrotoluene by heating to a temperature near the boiling point and then cooled, highly pure 1,5-dinitroanthraquinone crystal is precipitated at a certain temperature while 1,8-dinitroanthraquinone having larger solubility is precipitated by further cooling the filtrate as it is or after diluting with a diluent such as methanol.

The method for the separation of the invention is characterized in that the separation state is extremely good and each of 1,5- and 1,8-dinitroanthraquinones can be obtained in high yield, and further the method is advantageous in that the separation can be achieved with the use of a small amount of inexpensive solvent, which can easily be recovered.

As described before, the solvents to be used in the separation in accordance with the invention are nitrobenzene, o-nitrotoluene, m-nitrotoluene and p-nitrotoluene used independently or as a mixture thereof. The solvent is satisfactorily used in an amount 2–10 times, preferably 3–8 times that of dinitroanthraquinones. Nitrobenzene may be used in a greater amount, but there is no such necessity. As the dinitroanthraquinone mixture, that obtained by the dinitration reaction having the composition of about 1 : 1 is the most preferable, but the mixture having inclined composition, e.g., the mixture wherein the weight ratio of 1,5-derivative to 1,8-derivative is from 80 : 20 to 20 : 80 may also be used in either dried form or an aqueous wet cake form.

The method of the separation in accordance with the invention is outlined as follows.

First, the mixture dinitroanthraquinones are added to the above-described nitrobenzenes and heated to 170° – 230° C to dissolve. In this occasion, cooling can be started immediately in the case of the mixture being completely dissolved, while in the case of the mixture being dissolved partially, it is suitable to maintain the mixture at the same temperature for several hours, e.g., 2 – 10 hours under stirring. Thereafter, the resulting solution is cooled and, at 100° – 160° C, hot filtration is conducted selecting the point at which pure 1,5-dinitroanthraquinone separates out. Nitrobenzenes are removed from the 1,5-dinitroanthraquinone thus obtained by washing with methanol or by steam distillation.

Upon drying, there can be obtained 1,5-dinitroanthraquinone with the purity of about 90%. Subsequently, the hot filtrate is cooled to 10° - 70° C as it is or after the addition of the washings such as methanol and, when 1,8-dinitroanthraquinone separates out, filtration, washing and drying are conducted. In the last filtrate and washings is selectively contained β-isomers, while almost no β-isomer is contained in the separated 1,5- and 1,8-dinitroanthraquinones. Thus, 1,5- and 1,8-dinitroanthraquinones are separated as the highly pure α, α-dinitroanthraquinones.

The present invention will be concretely explained with reference to examples which are not limitative, but illustrative. In the following examples, "parts" are by weight.

EXAMPLE 1

156 Parts of 98.5% nitric acid and 22.5 parts of 100% sulfuric acid are mixed at 20° - 30° C., and then cooled to 5° C.. 31.2 parts of anthraquinone is gradually added thereto over about 3 hours under stirring, and the resulting mixture is stirred at the same temperature for 3 hours. After confirming by thin layer chromatography that unreacted anthraquinone and the reaction intermediate of 1-nitroanthraquinone disappeared, the reaction solution is poured into 1640 parts of ice-water. The precipitate formed is filtrated out, washed with water and dried. Thus, there is obtained 44.0 parts (yield: 98.5%) of 1,5- and 1,8-dinitroanthraquinones with the purity of 87.7% in the total content.

In this Example, when experiment is similarly conducted without adding 100% sulfuric acid, there is obtained the mixture having extremely impure composition and containing 1-nitroanthraquinone as the major component, a large amount of unreacted anthraquinone and a slight amount of dinitroanthraquinones. In this case, when the reaction is prolonged to 24 hours, mononitroanthraquinone is obtained as a major component though the amount of unreacted anthraquinone is reduced. Furthermore, when the reaction is conducted at the elevated temperature of 30° C. for 24 hours, a large amount of impurities are produced resulting in low purity of the product though anthraquinone is converted to dinitroanthraquinone mostly.

EXAMPLE 2

31.2 Parts of anthraquinone is added to 234 parts of 98.8% nitric acid at 10° - 15° C. to dissolve, and 22.5 parts of 100% sulfuric acid is gradually added dropwise thereto at 5° - 10° C.. After the completion dropwise addition, the resulting mixture is stirred for 3 hours at 10° - 15° C, then poured into 1350 parts of ice-water, filtrated out, washed with water, and dried. Thus, there are obtained 43.6 parts (yield: 97.5%) of 1,5- and 1,8-dinitroanthraquinones with good purity similar to that in Example 1.

EXAMPLE 3

40 Parts of a mixture of 1,5- and 1,8-dinitroanthraquinones (1,5-derivative:1,8-derivative:β-isomer ≈ 45:40:15) is added to 160 parts of nitrobenzene and stirred for 3 hours at 200° - 210° C.. Thereafter, the mixture is cooled to 155° C. over about 30 minutes and, after maintaining at 150° - 155° C. for 30 minutes, the crystal formed is filtered at 150° C. by means of suction using a suction filter pre-heated to 150° C.. The filtration rate in this case is extremely rapid. Subsequently, the first precipitate on the filter is washed with 80 parts of methanol, and the resulting washings are added to the nitrobenzene filtrate. The precipitate is further washed with about 80 parts of methanol to remove nitrobenzene, washed with water, and dried.

Thus, there is obtained 15.8 parts (yield: 39.5%) of 1,5-dinitroanthraquinone as the first precipitate, which purity is 93.5% and only 5.3% of 1,8-dinitroanthraquinone is contained therein.

The solution of filtrate and washings obtained by combining the nitrobenzene filtrate with 80 parts of the methanol washings is cooled to 30° - 35° C, and the precipitate formed is filtrated out. The precipitate thus formed is then washed with about 80 parts of methanol to thereby remove nitrobenzene, subsequently washed with water and dried. Thus, there is obtained 15.4 parts (yield:38.5%) of 1,8-dinitroanthraquinone with 82.5% purity, in which only 15% of 1,5-dinitroanthraquinone is contained.

EXAMPLE 4

40 Parts of a mixture of 1,5- and 1,8-dinitroanthraquinone (having the same composition as in Example 3) is added to 160 parts of nitrobenzene and, after heat-processing in the same manner as in Example 3, hot filtration is conducted at 150° C. The crystal thus collected is well squeezed, washed with methanol then with water, and dried. Thus, there is obtained 15.6 parts of 1,5-dinitroanthraquinone having the same high purity as in Example 3. The nitrobenzene filtrate is cooled to 25° C without adding the methanol washings, and the crystal thus precipitated is filtrated out, washed with methanol then with water, and dried. Thus, there is obtained 15.5 parts of 1,8-dinitroanthraquinone having the purity approximately as high as in Example 3.

EXAMPLE 5

When the processing described in Example 3 is repreated except for using o-nitrotoluene in place of nitrobenzene, 16 parts of 1,5-dinitroanthraquinone and 14.8 parts of 1,8-dinitroanthraquinone are obtained as the first and second precipitates, respectively.

While the invention has been described in detail and with reference to specific embodiments thereof, it will be apparent that various changes can be made therein without departing from the spirit and scope thereof.

What is claimed is:

1. A process for preparing 1,5- and 1,8-dinitroanthraquinones, which comprises reacting anthraquinone and sulfuric acid and nitric acid at a temperature of 0° to 50° C., nitric acid being used in an amount 3 to 30 times by weight that of anthraquinone, the concentration of said nitric acid not being lower than 96%, and sulfuric acid being used in an amount less than that of nitric acid and more than 0.5 mole per mole of anthraquinone, the concentration of said sulfuric acid not being lower than 98% and recovering a mixture of 1,5- and 1,8-dinitroanthraquinones according to the conventional procedure.

2. The process according to claim 1, wherein anthraquinone is added to a mixture of sulfuric acid and nitric acid.

3. The process according to claim 1, wherein sulfuric acid is added to a mixture of anthraquinone and nitric acid.

4. A process for preparing 1,5- and 1,8-dinitroanthraquinones, which comprises
   (1) reacting anthraquinone and sulfuric acid and nitric acid at a temperature of 0° to 50° C., nitric acid being used in an amount of 3 to 30 times by weight that of anthraquinone and the concentration of said nitric acid being 96%, and sulfuric acid being used in an amount less than that of nitric acid and more than 0.5 mole per mole of anthraquinone and the concentration of said sulfuric acid-being 98%.

(2) dissolving the resultant mixture in nitrobenzene or a nitrotoluene or a mixture thereof by heating to 170° to 230° C., the amount of nitrobenzene, a nitrotoluene of mixture thereof being 2 to 10 time the amount of the mixture from step (1), (3) cooling the resulting solution to 100° to 160° C. to precipitate 1,5-dinitroanthraquinone, (4) separating the precipitated 1,5-dinitroanthraquinone by hot filtration, (5) cooling the filtrate obtained above to 10° to 70° C. to precipitate 1,8-dinitroanthraquinone, and (6) separating the precipitated 1,8-dinitroanthraquinone by filtration.

5. The process of claim 4 wherein the amount of nitrobenzene, a nitroluene or mixture thereof is 3 to 8 times the amount of the mixture from step 1 of the process.

* * * * *